Nov. 22, 1938.      A. BOEVE      2,137,440

FRONT VIEW MIRROR DEVICE

Filed April 26, 1937      2 Sheets—Sheet 1

Inventor

A. Boeve

By Clarence A. O'Brien
Hyman Berman
Attorneys

Nov. 22, 1938.  A. BOEVE  2,137,440
FRONT VIEW MIRROR DEVICE
Filed April 26, 1937  2 Sheets-Sheet 2
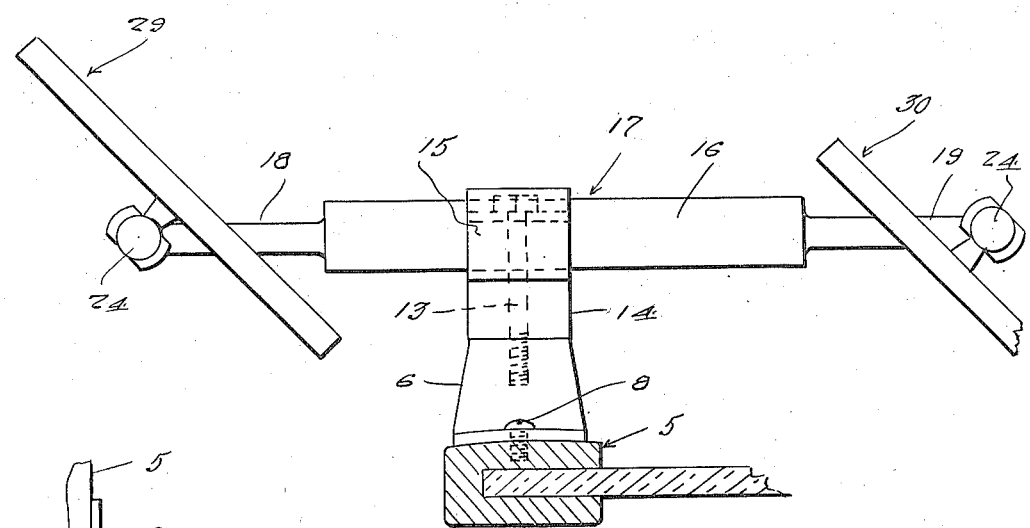
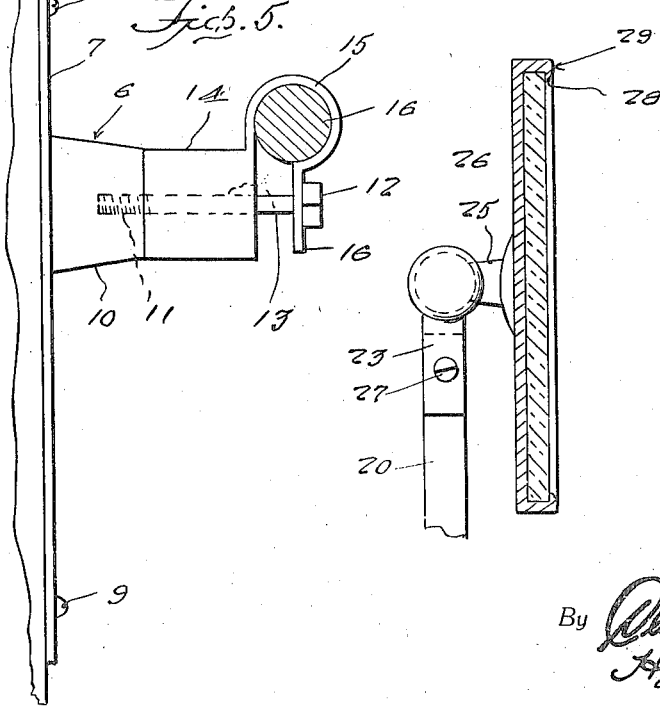
Inventor
A. Boeve Patented Nov. 22, 1938

2,137,440

UNITED STATES PATENT OFFICE 2,137,440

FRONT-VIEW MIRROR DEVICE

Arie Boeve, Hull, Iowa

Application April 26, 1937, Serial No. 139,058

1 Claim. (Cl. 88—86)

My invention relates generally to means to increase the field of vision of the driver of an automobile or the like, and particularly to a mirror arrangement for mounting at the front part of the automobile to enable the driver to see ahead on the opposite side of the road when driving behind another vehicle, and an important object of the invention is to provide a simple and efficient arrangement of this character which greatly helps in the safe and efficient management of vehicles in heavy traffic, and particularly in passing other vehicles on the road.

Other important objects of my invention will be apparent from a reading of the following description taken in connection with the drawings, wherein for purposes of illustration I have set forth a preferred embodiment of my invention.

In the drawings:

Figure 1 is a general transverse vertical sectional view taken through the driver's compartment of an automobile and showing the back of the windshield thereof and showing the device of the invention installed with respect thereto.

Figure 2 is an enlarged horizontal sectional view taken through the left hand part of the windshield and showing the device of the invention in top plan and mounted thereon.

Figure 3 is a front elevational view of the device.

Figure 4 is a transverse vertical sectional view taken through one of the mirrors.

Figure 5 is a transverse vertical sectional view taken through the supporting arm of the device.

Referring in detail to the drawings, the numeral 5 generally designates the automobile windshield frame on which is conveniently mounted the bracket 6 which comprises the vertical plate 7 fastened to the outer side or front side of the windshield frame by means of screws or bolts 8 and 9 and the boss 10 which has a threaded opening 11 therein to receive the clamping and adjusting bolt or screw 12 which traverses a smooth bore 13 in a clamp bracket 14, the outer end of the clamp bracket including a three-quarter circular flat spring portion 15 having an ear 16 depending therefrom and through which the screw or bolt 12 passes. Screwing in the bolt or screw 12 obviously contracts the spring clamp portion 15 on the enlarged round portion 16 of the mirror support which is generally designated 17. Loosening the bolt or screw 12 will enable rotating the mirror support 17 for adjustment purposes.

Extending from the opposite ends of the enlarged round portion 16 are reduced axial arms 18 and 19 which have upstanding portions 20 and 21, respectively, on the upper ends of which are upwardly projecting clamp fingers 22 and 23 which have upper cupped portions embracing and frictionally engaging diametrically opposite sides of the balls 24 which are on brackets 25 fastened to the back of the mirror casings 26. An adjusting screw 27 traverses the lower part of the clamp fingers 22 and 23 and also the upper part of the standards 20 and 21 and act as means to apply and release the frictional engagement of the fingers with the balls 24 in adjusting the mirrors to the desired angle relative to the mirror support 17 and relative to each other. Each mirror comprises the casing 26 having the annular channel member 28 to retain the circular mirror 29.

It is to be understood that the bracket 7 may be mounted to the windshield post instead of to the frame of the windshield or to any other suitable place on the front part of the automobile whereby the larger mirror 29 will be located laterally outwardly off the left side of the automobile a sufficient distance to view the left hand side of the road ahead of the vehicle behind which the driver is driving. The smaller mirror 30 is arranged so as to be located within the normal field of vision of driving, that is, in front of the windshield. The mirrors are adjusted relative to each other so that the driver may by looking in the small mirror 30 see the road ahead of the vehicle in front of him as depicted in the large mirror 29 which faces forwardly.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

What is claimed is:

In a device of the character described, a plate adapted to be fastened to a windshield frame, a tapered boss on said plate, a clamping bracket comprising an apertured shank portion, a substantially circular spring portion on one end thereof, an apertured ear portion extending from said circular spring portion in alignment with said apertured shank portion, a U-shaped bar mounted in said circular spring portion, a screw threaded member adapted to be passed through said aligned apertured ear and shank portions and threaded into said boss for securing and holding the U-shaped bar and clamping bracket in adjusted position on said tapered boss, and clamping fingers secured to the ends of said U-shaped bar for supporting and holding in adjusted position a pair of coacting mirrors.

ARIE BOEVE.